United States Patent [19]
Papazoglou et al.

[11] Patent Number: 5,420,198
[45] Date of Patent: May 30, 1995

[54] PROCESS FOR THE PREPARATION OF POLYMIDE BLENDS HAVING IMPROVED LOW TEMPERATURE PROPERTIES

[75] Inventors: Elisabeth S. Papazoglou; Jay S. Rosenthal, both of West Chester, Pa.

[73] Assignee: ARCO Chemical Technology, L.P., Greenville, Del.

[21] Appl. No.: 885,088

[22] Filed: May 18, 1992

Related U.S. Application Data

[63] Continuation of Ser. No. 519,089, May 4, 1990, abandoned.

[51] Int. Cl.$^6$ .............................................. C08L 77/00
[52] U.S. Cl. ....................................... 525/66; 525/179
[58] Field of Search ............................................. 525/66

[56] References Cited

U.S. PATENT DOCUMENTS

| | | | |
|---|---|---|---|
| 4,131,598 | 12/1978 | Abolins | 260/42.18 |
| 4,174,358 | 11/1979 | Epstein | 525/183 |
| 4,421,892 | 12/1983 | Kasahara et al. | 524/514 |
| 4,427,828 | 1/1984 | Hergenrother et al. | 525/66 |
| 4,528,326 | 7/1985 | Dean | 525/66 |
| 4,777,211 | 10/1988 | Lavengood et al. | 525/66 |
| 4,795,782 | 1/1989 | Lutz et al. | 525/66 |
| 4,902,749 | 2/1990 | Akkappeddi et al. | 525/66 |
| 5,010,136 | 4/1991 | Ohmae et al. | 525/66 |
| 5,047,479 | 9/1991 | Ohmae et al. | 525/183 |
| 5,049,961 | 9/1991 | Shimizu et al. | 525/66 |

FOREIGN PATENT DOCUMENTS

| | | |
|---|---|---|
| 277381 | 10/1988 | European Pat. Off. |
| 3604348 | 8/1987 | Germany . |
| 3604376 | 8/1987 | Germany . |
| 56-112957 | 9/1981 | Japan . |
| 57-025355 | 9/1982 | Japan . |
| 62-228844 | 1/1987 | Japan . |

OTHER PUBLICATIONS

*Encyclopedia of Polymer Science and Technology*, vol. 12, pp. 435–436 (1988).
D'Orazio et al. [*Polymer Eng. Sci.*, 24 (i), 48(1984)].
Borggreve et al. [*Polymer*, 28 1489 (1987)].

*Primary Examiner*—Ana L. Carrillo
*Attorney, Agent, or Firm*—Stephen D. Harper

[57] ABSTRACT

A process for the preparation of moldable polymer blends having improved low temperature impact properties and reduced brittleness is disclosed. In one embodiment, a polyamide such as nylon-6 and an anhydride functionalized elastomer such as an EPDM rubber grafted with maleic anhydride are first melt-blended. The resulting composition is then blended with a thermoplastic copolymer of an $\alpha,\beta$-unsaturated carboxylic acid anhydride such as maleic anhydride and a monovinyl aromatic monomer such as styrene. The moldable polymer blends thus obtained are suitable for use as engineering resins.

13 Claims, No Drawings

PROCESS FOR THE PREPARATION OF POLYMIDE BLENDS HAVING IMPROVED LOW TEMPERATURE PROPERTIES

This is a continuation of application Ser. No. 07/519,089, filed May 4, 1990, now abandoned.

FIELD OF THE INVENTION

This invention is directed to multi-phase polyblends of polyamide resins, high molecular weight thermoplastic copolymers containing unsaturated carboxylic acid anhydride, and adducts of carboxylic acid anhydrides and elastomeric polymers. More particularly, the invention relates to methods for the preparation of such blends whereby the low temperature impact properties and toughness of the blends are improved.

BACKGROUND OF THE INVENTION

Polyamide resins have been widely used as thermoplastics in molding applications because of their high resistance to chemicals, heat, and abrasion and their generally good mechanical properties. However, polyamide resins possess certain deficiencies, including shrinkage during molding and high hygroscopicity. The tendency to absorb water results in dimensional stability problems and loss of mechanical strength. Although polyamide resins are fairly tough under most impact conditions, they can be notch-sensitive and brittle at low temperatures. Polyamide resins have been blended with other polymers to compensate for these deficiencies or to enhance mechanical properties such as stiffness and tensile strength.

U.S. Pat. No. 4,528,326 teaches polyblends of polyamide resins having at least seven methylene units separating each amide functional group and rubber-modified styrene/unsaturated carboxylic acid anhydride or imide copolymer resins. Polyblends of polyamides containing fewer than seven methylene units were found to have undesirably low impact strength.

Jpn. Pat. No. 56-112957 teaches polyblends of polyamide resins and rubber-modified styrene copolymer containing high levels of unsaturated carboxylic acid anhydride, with the styrene copolymer preferably also containing an unsaturated carboxylic acid ester in order to minimize the extent of undesired cross-linking during melt-kneading.

U.S. Pat. No. 4,421,892 contains similar teachings regarding polyblends of polyamide resins and styrene copolymers containing high levels of unsaturated carboxylic acid anhydride. Good mechanical strength was only achieved in such polyblends when an unsaturated carboxylic acid ester was additionally present in the styrene copolymer.

Jpn. Pat. No. 57-025355 teaches blends of styrene/maleic anhydride copolymers and polyamides, but does not teach how adequate impact properties may be accomplished with such blends.

Ger. Pat. No. 3,604,348 teaches blends of polyamides, ethylene/acrylate or acrylic acid copolymers, and styrene/acrylic acid or styrene/anhydride copolymers. Similar teachings are found in Ger. Pat. No. 3,604,376 which additionally discloses the use of a conjugated diene polymer or copolymer to improve the impact strength of such blends.

U.S. Pat. No. 4,174,358 teaches the toughening of polyamides by blending with elastomeric polymers bearing functional groups, including anhydride, which may chemically react with the polyamide so as to achieve grafting between the components.

U.S. Pat. No. 4,427,828 teaches the impact modification of polyamides with maleic anhydride adducts of either a hydrogenated polymer of a conjugated diene or a hydrogenated block or random copolymer of a copolymer of a conjugated diene and a monovinyl aromatic monomer.

U.S. application Ser. No. 07/295,078, now abandoned filed Jan. 6, 1989, discloses moldable multi-phase polyblends comprising blends of polyamides, thermoplastic copolymers of an , $\alpha$, $\beta$-unsaturated carboxylic acid anhydride and monovinyl aromatic monomer, and anhydride-functionalized elastomers. The functionalized elastomers are low in unsaturation, providing polyblends having good oxidative stability, and are $\alpha$, $\beta$-unsaturated carboxylic acid anhydride adducts of either EPDM-type rubbers, hydrogenated block or random copolymers of monovinyl aromatic monomers and conjugated dienes, or hydrogenated polymers of conjugated dienes.

Although these polyblends have an excellent overall balance of properties, including good impact properties at room temperature, increasing the toughness of such blends would further enhance the utility of these engineering resins. In particular, there is a need for polyamide blends having reduced brittleness at low service temperatures.

SUMMARY OF THE INVENTION

According to this invention, there is provided a process for producing a moldable polymer blend having improved low temperature impact properties comprising the steps of (A) forming a first blend composition by melt blending
  (i) a polyamide having a number average molecular weight of at least about 8,000;
  (ii) a functionalized elastomer which is an adduct of an $\alpha$, $\beta$-unsaturated carboxylic acid anhydride and an elastomeric polymer selected from the group consisting of
    (a) a random copolymer of ethylene, at least one $C_3$ to $C_6$ $\alpha$-olefin, and at least one diene,
    (b) a block copolymer wherein at least two blocks consist essentially of recurring units of at least one monovinyl aromatic monomer and at least one other block consists essentially of recurring units of at least one conjugated diene and wherein said other block is substantially hydrogenated such that the unsaturation level of said other block is less than 20 percent of the original unsaturation level;
    (c) a random copolymer of at least one monovinyl aromatic monomer and at least one conjugated diene, wherein said random copolymer is substantially hydrogenated such that the unsaturation level of said random copolymer is less than 20 percent of the original unsaturation level; or
    (d) a polymer of at least one conjugated diene, wherein said polymer is substantially hydrogenated such that the unsaturation level of said polymer is less than 20 percent of the original unsaturation level; and
  (iii) optionally, a first portion of a thermoplastic copolymer of an unsaturated carboxylic acid anhydride, a vinyl aromatic monomer, and, optionally, an unsaturated monomer selected from the group consisting of unsaturated carboxylic acids, unsaturated dicarboxylic acid imides, unsaturated nitrile monomers, and unsaturated carboxylic acid esters, said thermoplastic copolymer having a number-average molecular weight of at least about 30,000; and (B) melt-blending said first blend composition and a second portion of the thermoplastic copolymer, with the proviso that the amount of the first portion of the thermoplastic copolymer is no greater than the amount of the second portion of the thermoplastic copolymer.

Also provided by this invention is a process for producing a moldable polymer blend having improved low temperature impact properties comprising the steps of (A) melting a polyamide having a number average molecular weight of at least about 8,000; and (B) melt-blending the melted polyamide from step (A) with (i) a functionalized elastomer which is an adduct of an $\alpha$, $\beta$-unsaturated carboxylic acid anhydride and an elastomeric polymer selected from the group consisting of (a) a random copolymer of ethylene, at least one $C_3$ to $C_6$ $\alpha$-olefin, and at least one diene monomer, (b) a block copolymer wherein at least two blocks consist essentially of recurring units of at least one monovinyl aromatic monomer and at least one other block consists essentially of recurring units of at least one conjugated diene, and wherein said other block is substantially hydrogenated such that the unsaturation level of said other block is less than 20 percent of the original unsaturation level;

(c) a random copolymer of at least one monovinyl aromatic monomer and at least one conjugated diene wherein said random copolymer is substantially hydrogenated such that the unsaturation level of said random copolymer is less than 20 percent of the original unsaturation level; or (d) a polymer of at least one conjugated diene, wherein said polymer is substantially hydrogenated such that the saturation level of said polymer is less than 20 percent of the original unsaturation level; and (ii) a thermoplastic copolymer of an unsaturated carboxylic acid anhydride, a vinyl aromatic monomer, and, optionally, an unsaturated monomer selected from the group consisting unsaturated carboxylic acids, unsaturated dicarboxylic acid imides, unsaturated nitrile monomers, and unsaturated carboxylic acid esters, said thermoplastic copolymer having a number average molecular weight of at least about 30,000.

DETAILED DESCRIPTION OF THE INVENTION

The moldable polymer blends produced by the process of this invention are tough rigid thermoplastics having a fine dispersion microstructure observable by electron microscopy. The compositions of the continuous and disperse phases depend on the relative amounts of the blend components employed. The disperse phase when viewed by electron microscopy appears as particles of extremely small average diameter. It is preferred that the average diameter of the particles be as small as possible, with the preferred diameter being less than about 5 microns. Most preferably, the particle diameter is less than about 2 microns. The particle size of the disperse phase is much smaller than would be expected from the large differences in the solubility parameters of the individual components of the polyblend.

Without wishing to be bound by any particular theory, it is believed that compatibilization of the polyamide and thermoplastic copolymer, resulting in the excellent overall balance of properties possessed by the polyblends, is achieved by chemical reaction of the amine end-groups of the polyamide with the anhydride functionality of the thermoplastic copolymer and the functionalized elastomer. The polyamide may undergo limited degradation and chain scission during blending to create additional amine groups available for reaction with the anhydride functionality.

The superior impact properties of the polyblends of this invention, as compared to blends of polyamides and styrene/anhydride copolymers alone, are believed to be due to chemical reaction of the amine groups of the polyamide with the carboxylic acid anhydride groups of the functionalized elastomer. The compatibilization which results from this grafting helps to ensure that the elastomeric polymer is well-dispersed throughout the polyblend matrix and is at least partially compatibilized with the matrix, thereby functioning effectively as an impact modifier.

However, the polymer blends produced by the process of this invention can include not only the graft copolymers described above, but also varying amounts of ungrafted polyamide, ungrafted functionalized elastomer, and ungrafted thermoplastic copolymer. The relative amounts of the graft copolymer, unreacted polyamide resin, and unreacted thermoplastic copolymer will depend on the component molecular weights, the chemical composition of the components, and blending temperature and shear rate, among other factors. In general, however, it is desirable to achieve a high proportion of the graft copolymer in the blend.

In addition to improved low temperature toughness, another advantage of the polyblends produced by the process of this invention is the higher melt index and hence lower viscosity of said polyblends as compared to blends obtained using other blending procedures. Processing and molding of thermoplastic resins are generally facilitated by relatively low viscosity at a given shear rate.

The polyamide resin may constitute from about 9 to 94 weight percent, more preferably from about 35 to 75 weight percent, of the total polymer blend of this invention. Any polyamide is suitable for use in the practice of this invention, provided it has a number average molecular weight of at least about 8,000. Aliphatic polyamides are preferred. It is preferred that the polyamide have an average of at least 0.5 amine end-group per chain. The preferred molecular weight range is from about 10,000 to 40,000. Suitable polyamides include nylon-6, nylon-6,6, nylon-6,9, nylon-6,10, nylon-6,12, nylon-11, nylon-12 and mixtures thereof. Nylon-6,6 (polyhexamethylene adipamide) and nylon-6(polycaprolactam) are the preferred polyamide resins. The polyamide resins may be prepared by any of the methods familiar to those skilled in the art, including condensation of diamines and di-acid chlorides, condensation of diamines and dicarboxylic acids, and ring-opening polymerization of lactams.

The polymer blends produced by the process of this invention are additionally comprised of from about 5 to 90 weight percent, preferably about 15 to 45 weight percent, of a thermoplastic copolymer. The thermoplastic copolymer preferably contains from about 1 to 30 weight percent of an unsaturated carboxylic acid anhydride, from about 50 to 99 weight percent of a vinyl aromatic monomer, and, optionally, up to 40 weight percent of an unsaturated monomer selected from the group consisting of unsaturated carboxylic acids, unsaturated dicarboxylic acid imides, unsaturated nitrile monomers, and unsaturated carboxylic acid esters.

Examples of unsaturated carboxylic acid anhydrides suitable for incorporation into the thermoplastic copolymer component of the invention include itaconic anhydride, citraconic anhydride, ethyl maleic anhydride, methyl itaconic anhydride, chloromaleic anhydride, bromomaleic anhydride, tetrahydrophthalic anhydride, and their mixtures. The preferred unsaturated carboxylic acid anhydride is maleic anhydride. It is preferred that the thermoplastic copolymer contain from about 1 to 10 weight percent of the unsaturated carboxylic acid anhydride, as optimum properties, particularly impact strength, are obtained at these relatively low levels of anhydride. The presence of greater amounts of anhydride tends to result in poorer compatibilization, lower mechanical strength, and poorer impact properties, although this can be partially compensated for by carrying out the blending under conditions such that a lower degree of chemical reaction takes place between the polyamide and the thermoplastic copolymer.

The thermoplastic copolymer is additionally comprised of at least one vinyl aromatic monomer copolymerizable with the unsaturated carboxylic acid anhydride. Suitable vinyl aromatic monomers include styrene, alpha-methylstyrene, ar-methylstyrene, ar-ethylstyrene, ar-isopropylstyrene, ar-tert-butylstyrene, vinyl naphthalene, and their mixtures. Styrene is the preferred vinyl aromatic monomer. Unsaturated nitriles such as acrylonitrile and methacrylonitrile, unsaturated carboxylic acids such as acrylic acid and methacrylic acid as well as unsaturated carboxylic acid esters such as methyl methacrylate and n-butyl acrylate may also be used as comonomers in addition to the vinyl aromatic monomer. Unsaturated dicarboxylic acid imides such as N-phenylmaleimide and maleimide are also useful as comonomers. In contrast to unsaturated carboxylic acid anhydride monomers, imides do not appear to chemically react with the polyamide resin component when incorporated into the thermoplastic copolymer compositions of this invention. Good compatibilization, small disperse particle size, and good impact properties are not achieved if the thermoplastic copolymer contains imide but not anhydride. However, the presence of imide together with anhydride can improve certain properties of the final polyblend, such as stiffness and heat distortion temperature.

The preferred thermoplastic copolymers suitable for use in the process of this invention are styrene/maleic anhydride copolymers containing from about 1 to 10 weight percent anhydride. Particularly suitable for use are "DYLARK" resins, which are high molecular weight copolymers of styrene and maleic anhydride commercially available from ARCO Chemical Company.

The thermoplastic copolymers may be prepared by any of the several methods available for their synthesis. For example, the copolymers may be obtained by solution copolymerization directly from the respective monomers by the incremental addition of the reactive monomer as taught by U.S. Pat. No. 2,971,939 or by a continuous recycle polymerization process described in U.S. Pat. Nos. 2,769,804 and 2,989,517. Alternatively, a suspension polymerization process as taught in U.S. Pat. No. 3,509,110 may be employed. The teachings of all these patents are incorporated herein by reference. The number average molecular weight of the thermoplastic copolymer is at least about 30,000, and preferably is less than about 500,000. The preferred melt flow rate is from about 0.1 to 10 g/10 min. (Condition L).

The thermoplastic copolymer can be impact-modified using any art-recognized method of incorporating one or more rubber impact modifiers. Typically, such impact modifiers are polymers which are elastomeric in nature and which have glass transition temperatures below 0° C. Examples of suitable impact modifiers include butadiene rubber, EPDM rubber, butadiene-acrylonitrile rubber, butadiene-styrene rubber, isoprene rubber, isoprene-styrene rubber, and block copolymers of butadiene-styrene. Preferably, the impact modifiers are incorporated into the thermoplastic copolymer monomer mixture prior to polymerization using, for example, the methods of U.S. Pat. Nos. 4,097,551, 4,223,046, and 3,919,354 (incorporated herein by reference in their entirety). It is desirable to have the impact modifier chemically grafted to the thermoplastic copolymer.

The use of thermoplastic copolymer which is impact-modified is preferred, as the impact properties of the resulting polyblends invention tend to be highest when copolymers of this type are employed. It is preferred that the thermoplastic copolymer contain between 2 and 25 parts by weight rubber per 100 parts thermoplastic copolymer if it is rubber-modified.

The functionalized elastomer may comprise from about 1 to 30 weight percent of the total polymer blend prepared by the process of the invention, with 5 to 25 weight percent being the preferred range.

The functionalized elastomers suitable for use in the process of this invention are relatively soft, rubber-like polymers containing at least one carboxylic acid anhydride group per polymer chain. The anhydride group is believed to provide a potential grafting site for reaction with a polyamide amine end-group. The anhydride group is preferably pendent and not incorporated as a monomer unit in the backbone of the elastomeric polymer. To function effectively as an elastomer, this component should have a glass transition temperature less than 0° C.; more preferably, the glass transition temperature should be less than −40° C. The molecular weight of the functionalized elastomer should be sufficiently high so as to provide adequate elastomeric properties. In most instances, the number average molecular weight will preferably be above about 30,000. The functionalized elastomers should contain a minimum of cross-linking or gel in order to facilitate processing of the polyblends of this invention. Some degree of branching may be desirable, however.

A particular advantage of this invention is that the functionalized elastomers used contain relatively low levels of unsaturation as compared to, for example, elastomers containing substantial amounts of butadiene. The presence of low levels of unsaturation results in the polyblends of this invention having excellent weather resistance, particularly with respect to oxidation.

The α, β-unsaturated carboxylic acid anhydrides suitable for use in preparing the adducts usable in the polyblends of this invention are those anhydrides which may be grafted onto the random copolymer to provide amine-reactive functional groups. A particularly preferred anhydride is maleic anhydride. It is desirable that the anhydride comprise, in reacted form, from about 0.5 to 5 weight percent of the adduct.

In one embodiment, the functionalized elastomer may be an adduct of an α, β-unsaturated carboxylic acid anhydride and a random copolymer of ethylene, at least one $C_3$ to $C_6$ α-olefin, and at least one diene. This type of random terpolymer is the type generally referred to in the art as "EPDM" rubber. The α-olefin is preferably propylene, for reasons of availability, but may also be 1-butene, 1-pentene, 1-hexene or mixtures thereof. The diene suitable for use in preparing the random copolymer can be a conjugated diene such as 1,3-butadiene or isoprene, but more preferably is a nonconjugated diene. The nonconjugated diene may be a linear aliphatic diene of at least six carbon atoms which has either two terminal double bonds or one terminal double bond and one internal double bond. Alternatively, the nonconjugated diene may be a cyclic diene wherein one or both of the double bonds are part of a carboxylic ring. The structure of the copolymer may be altered as desired, particularly with respect to branching, by the selection of particular nonconjugated dienes as is well known to those skilled in the art. Particularly preferred nonconjugated dienes include 1,4-hexadiene, dicyclopentadiene, and 5-ethylidene-2-norbornene.

In this embodiment, it is preferred that the random copolymer contain from about 40 to 90 mole percent ethylene and 0.1 to 7.5 mole percent diene, with the remainder being propylene.

The adducts of α, β-unsaturated carboxylic acid anhydrides and random copolymers of ethylene, at least one $C_3$ to $C_6$ α-olefin, and at least one diene which are suitable for use in the polyblends of this invention may be prepared by any of the methods well-known to those skilled in the art. U.S. Pat. Nos. 3,884,882 and 4,010,223 and Eur. Pat. Appl. No. 353,720, incorporated herein by reference, teach the preparation of such adducts by thermally reacting carboxylic acid anhydrides and EPDM type rubbers. Examples of suitable commercially available functionalized elastomers of this type are Uniroyal "ROYALTUF 465" and Uniroyal "ROYALTUF 465A", which are maleated-EPDM rubbers containing about 1.2 and 0.7 weight percent maleic anhydride respectively.

In another embodiment, the functionalized elastomer is an adduct of an α, β-unsaturated carboxylic acid anhydride and a hydrogenated block copolymer having at least two blocks consist essentially of recurring units of at least one monovinyl aromatic monomer and at least one other block consisting essentially of recurring units of a conjugated diene. The monovinyl aromatic monomer is most preferably styrene, but may be any other similar monomer such as -methylstyrene, p-methylstyrene, p-ethylstyrene, p-tert-butyl styrene or p-chlorostyrene. Suitable conjugated dienes include butadiene and isoprene.

The 1,2-microstructure content of the conjugated diene block may be from about 7 to 100%. The block copolymer may contain up to 60 percent by weight of monovinyl aromatic monomer; higher monovinyl aromatic monomer content may yield block copolymers which are not sufficiently elastomeric for use in this invention.

The block copolymer is hydrogenated in order to reduce the level of unsaturation due to the conjugated diene block to less than 20 percent of the original value before hydrogenation. As discussed previously, the low levels of unsaturation provide the final polyblend with a high degree of resistance toward oxidative degradation.

The blocks of recurring monovinyl aromatic monomer units constitute relatively hard segments having a glass transition temperature or melting temperature above ambient while the block of conjugated diene is a relatively soft rubbery segment having a glass transition temperature below ambient. The block copolymer is thus a thermoplastic elastomer.

The adducts of α, β-unsaturated carboxylic acid anhydrides and hydrogenated block copolymers of monovinyl aromatic compounds and conjugated dienes suitable for use as functionalized elastomers in the polyblends of this invention may be prepared by any of the methods known in the art. U.S. Pat. No. 4,427,828, incorporated herein by reference, teaches the preparation of such adducts by thermally grafting the anhydride onto the hydrogenated block copolymer using an "ene"-type reaction. U.S. Pat. No. 4,578,429, incorporated herein by reference, teaches that similar adducts may also be obtained by free radical induced grafting. In this method, the resulting adducts are more thermally stable than the adducts of U.S. Pat. No. 4,427,828 due to the type of grafting which occurs. In addition, the functionalized hydrogenated block copolymers produced by free radical grafting may contain even lower levels of unsaturation since the presence of double bonds in the block copolymer is not required by this type of grafting mechanism. "Kraton FG1901X", a maleated block copolymer sold commercially by Shell Chemical Company which contains ca. 2 wt. % maleic (succinic) anhydride, is an example of a suitable functionalized elastomer of this type. Such materials are sometimes referred to as functionalized styrene-ethylene/1-butene-styrene (S-E/B-S) rubbers as the structure of the butadiene center block after hydrogenation resembles that of an ethylene/1-butene copolymer.

In another embodiment of this invention, the functionalized elastomer is an adduct of an α, β-unsaturated carboxylic acid anhydride and a hydrogenated random copolymer of at least one monovinyl aromatic monomer and at least one conjugated diene. Styrene is the preferred monovinyl aromatic monomer and preferably does not represent more than about 60 mole percent of the random copolymer in order that the glass transition temperature not be increased past the point at which the random copolymer would no longer function effectively as an elastomer. Other monovinyl aromatic monomers may be employed, however, including α-methyl styrene, o- or p-methylstyrene, p-tert-butylstyrene, p-chlorostyrene vinyl naphthalene, and the like or mixtures thereof. Suitable conjugated dienes include 1,3-butadiene, isoprene, chloroprene, 1,3-pentadiene, 2,3-dimethyl-1,3-butadiene and similar compounds, with 1,3-butadiene being the preferred diene. The random copolymer is hydrogenated to lower the unsaturation level to less than 20 percent of the original value. The 1,2-microstructure content of the random copolymers prior to hydrogenation can vary from about 10 to 100 percent. The preparation of adducts of this type is taught in U.S. Pat. No. 4,427,828, which teaches that random copolymers of conjugated dienes and monovinyl aromatic monomers may be functionalized with α, β-unsaturated carboxylic acid anhydrides in a thermal "ene"-type reaction. The teachings of this patent are incorporated herein by reference. Other methods of preparing such adducts will be well-known to those skilled in the art.

In yet another embodiment of this invention, a functionalized elastomer is employed which is an adduct of an α, β-unsaturated carboxylic acid anhydride and a hydrogenated polymer of at least one conjugated diene. The diene polymer is hydrogenated to an extent such that less than 20 percent of the original unsaturation remains. The diene may be any hydrocarbon containing two conjugated double bonds such as 1,3-butadiene, which is the preferred diene. Examples of other suitable dienes include isoprene, chloroprene, 2,3-dimethyl-1,3-butadiene, 1,3-pentadiene, and the like. Mixtures of dienes may also be employed. Polymers of conjugated dienes which may be utilized include those containing prior to hydrogenation a total of about 0.1 to 100 percent 1,2- and 3,4-microstructure content and about 0.1 to 99 percent 1,4-microstructure. It is preferred that the 1,2-microstructure content be from about 40 to 60 percent. "Ene"-type thermal grafting may be used to form adducts of this type, as described in U.S. Pat. No. 4,427,828 (incorporated by reference). Other synthetic routes to such adducts will be apparent to those familiar with the art.

In one embodiment of the process of this invention, the polyamide and the functionalized elastomer and, optionally, a minor portion of the thermoplastic copolymer are blended to form a first blend composition. The first blend composition is then melt-blended with the remainder of the thermoplastic copolymer to form the final moldable polymer blend. The amount of the first portion of the thermoplastic copolymer is no greater than the amount of the second portion of the thermoplastic copolymer. Preferably, however, the first portion is no greater than about 50 percent by weight of the second portion. For reasons which are not well understood, this procedure results in significantly improved low temperature impact properties as compared to the properties obtained if all of the components are blended in a single step.

Intimate and thorough mixing in each step of the process, preferably through the use of moderate shear conditions, is desirable. The melt-blending can be effected using a conventional melt-kneading or compounding apparatus for thermoplastic resins such as a kneader, Banbury mixer, or twin or single screw extruder. Each step of the blending procedure may be carried out at a temperature of between about 240° C. and 330° C., preferably 260° C. to 310° C. Higher temperatures may result in excessive decomposition while the desired degree of compatibilization may not be realized at lower temperatures. The blending time required in each step will vary depending on the temperature, the blend composition, and the degree of shear present, among other factors, but will typically be from about 10 seconds to 30 minutes. It is preferred to carry out the blending under vacuum in order to remove any water formed during imidization of the anhydride groups in the thermoplastic copolymer and the functionalized elastomer.

One method by which the process of this invention may be carried out is to preblend the polyamide and functionalized elastomer (and, optionally, a minor portion of the thermoplastic copolymer). The preblend, which can be in the form of pellets, for example, is then melt-blended with the remaining components of the thermoplastic resin composition. The process of this invention may also be conveniently carried out using a single pass through an extruder. The polyamide and the functionalized elastomer (and the first portion of the thermoplastic copolymer, if any) are fed into the extruder at a first feed port and melt-blended before introduction of the thermoplastic copolymer at one or more downstream feed ports. The total residence time in the extruder will preferably be from about 0.5 to 10 minutes.

In another embodiment of the process of this invention, the polyamide is first melted and then melt-blended with the other components of the thermoplastic resin composition (the functionalized elastomer and the thermoplastic copolymer). This procedure may most conveniently be carried out using an extruder equipped with multiple feed ports. The polyamide is added through the first feed port; the other components are then introduced at one or more downstream feed ports to the molten polyamide. Processing temperatures are preferably from about 240° C. to 330° C. (more preferably, from about 260° C. to 310° C).

Additives such as heat or light stabilizers, anti-oxidants, pigments, lubricants, anti-static agents or fillers such as glass or carbon fibers or mineral fillers may additionally be incorporated into the polymer blends produced by the process of this invention. The polymer blends may be employed in any application for which thermoplastic resins are normally used, including extrusion, injection, or blow molding.

The following examples are meant to illustrate, but not limit, the invention. The evaluation of material properties was performed based on the following ASTM standard tests: flexural strength and modulus (D-790), tensile strength (D-638), notched Izod (D-256), DTUL (deflection temperature under load at 264 psi, D-648), and penetration impact (D-3763).

EXAMPLES 1-3

Blends of "Nivionplast 303 HV" polyamide (designated A-1; a nylon 6 resin having a number average molecular weight of 25,000 and containing 0,041 meq NH$_2$/gram, available commercially from Enichem), "Royaltuf 465A" functionalized elastomer (designated B-1, a maleic anhydride functionalized EPDM rubber available from Uniroyal and containing about 0.7 weight percent grafted maleic anhydride), and "Dylark 700" resin (designated C-1; a rubber-modified styrene/maleic anhydride copolymer containing about 7 weight percent maleic anhydride available from ARCO Chemical Co.) were prepared using a Welding Engineers counter-rotating non-intermeshing twin screw devolatilizing extruder. In Comparative Example 1, all three components of the blend were simultaneously fed into the extruder. Although the impact properties of the blend thus obtained were satisfactory at room temperature (73° F.), the blend became undesirably more brittle at lower temperatures as shown in Table I. The low temperature impact properties were dramatically improved by first melt-blending the polyamide and the functionalized elastomer and then adding the styrene/maleic anhydride copolymer at a downstream feed port to the melted mixture of polyamide and functionalized elastomer (Example 2). This significant improvement was achieved without increasing the proportion of functionalized elastomer in the blend or compromising the tensile strength or stiffness of the blend. In Example 3, 10 parts of the styrene/maleic anhydride copolymer were added together with the polyamide and the functionalized elastomer at the initial feed port and the remaining 20 parts of the thermoplastic copolymer added downstream. This procedure also resulted in an enhancement of the low temperature penetration impact values of the blend compared to the procedure of Example 1. However, the increase in toughness at −20° F. was not as pronounced as when all of the styrene/maleic anhydride copolymer was added downstream.

EXAMPLES 4–5

In Example 4, the polyamide was fed to the Welding Engineers extruder described in Examples 1–3 and premelted before introduction of the functionalized elastomer and thermoplastic copolymer at a downstream feed port. Low temperature brittleness of the resulting polyblend was substantially reduced compared to the product obtained using the process of Comparative Example 1 wherein all of the components were introduced to the extruder simultaneously. The polyblend of Example 5 was prepared using similar extruder conditions as in Example 4, but the polyamide and functionalized elastomer were melt-blended before downstream introduction of the thermoplastic copolymer. Low temperature impact properties were again significantly enhanced as compared to those obtained in Comparative Example 1.

EXAMPLES 6–19

Examples 6–19 demonstrate the use of a variety of different polyamides, functionalized elastomers, and thermoplastic copolymers in the process of this invention.

Blending Method D:

The blending procedure of Example 2 was followed.

Polyamides

A-1: "Nivionplast 303HV", a nylon 6 polyamide available from Enichem.

A-2: "Nivionplast 333 HV", a nylon 6 polyamide having a number average molecular weight of 25,000 and containing 0.039 meq $NH_2$/gram, available from Enichem.

A-3: "Nivionplast 273 MR", a nylon 6 polyamide available from Enichem.

Functionalized Elastomers

B-1: "Royaltuf 465A", a maleated-EPDM rubber containing about 0.7 weight percent grafted maleic anhydride available from Uniroyal.

B-2: "Royaltuf 465", a maleated-EPDM rubber containing about 1.2 weight percent grafted maleic anhydride available from Uniroyal.

Thermoplastic Copolymers

C-1: "Dylark 700", a rubber-modified styrene/maleic anhydride resin containing about 6 weight percent maleic anhydride available from ARCO Chemical Co.

C-2: "Dylark 250", a rubber-modified styrene/maleic anhydride resin containing about 8 weight percent maleic anhydride available from ARCO Chemical Co.

C-3: "Dylark 232", a styrene/maleic anhydride resin containing about 8 weight percent maleic anhydride available from ARCO Chemical Co.

C-4: a rubber-modified styrene/maleic anhydride resin containing about 16 weight percent "Stereon 721A" rubber (a styrene/butadiene block copolymer available from Firestone) and 2 weight percent maleic anhydride, prepared in accordance with U.S. Pat. No. 3,919,354.

C-5: "Dylark 132", a styrene/maleic anhydride resin containing about 5 weight percent maleic anhydride, available from ARCO Chemical Co.

C-6: a styrene/maleic anhydride resin containing about 2 weight percent maleic anhydride.

EXAMPLES 20–24

These examples illustrate the use of varying proportions of different polyamides, functionalized elastomers, and thermoplastic copolymers in the process of this invention (Table III).

Blending Method E:

The polyamide and functionalized elastomer are preblended using a ZSK extruder. The extruded blend is then blended with the thermoplastic copolymer using the Welding Engineers twin screw extruder described in Examples 1–3, with the thermoplastic copolymer being introduced at a downstream feed port.

Blending Method F:

The melt-blending procedure of Example 4 is followed.

Polyamides

A-4: "Ultramid S4" polyamide, a nylon-6,10 available from BASF.

A-5: "Zytel 151 LNC-10" polyamide, a nylon-6,12 available from E. I. dupont de Nemours.

A-6: "Vestamid L 1901" polyamide, a nylon-12 available from Huls America.

A-7: "BMNO P40" polyamide, a nylon-11 available from Atochem.

A-8: "Nydur B-40-Sk" polyamide, a nylon-6 available from Mobay.

Functionalized Elastomers

B-4: Shell Chemical "Kraton FG 1901X" maleic anhydride functionalized hydrogenated styrene/butadiene block copolymer containing 2 weight percent maleic anhydride and 28 weight percent polymeric styrene.

B-5: Hydrogenated styrene/butadiene block copolymer containing about 0.5 weight percent grafted maleic anhydride and 29 weight percent polymeric styrene and having a molecular weight of about 54,000; prepared in accordance with Examples 1–5 of U.S. Pat. No. 4,795,782.

B-6: Maleic anhydride functionalized EPHD (ethylene-propylene-hexadiene) rubber prepared in accordance with Example 1 of U.S. Pat. No. 3,884,882; maleic anhydride content about 2 weight percent; inherent viscosity about 1.5; monomer composition of EPHD rubber:61.4 weight percent ethylene, 32 weight percent ethylene, and 6.6 weight percent 1,4-hexadiene.

B-7: Maleic anhydride functionalized polybutadiene prepared in accordance with Example 1 of U.S. Pat. No. 4,427,828; $M_w$ 170,000; maleic anhydride content about 5 weight percent.

B-8: Maleic anhydride functionalized EPDM tetrapolymer rubber prepared in accordance with Example 13 of U.S. Pat. No. 4,010,223; monomer composition of EPDM rubber: 70 weight percent ethylene, 23 weight percent propylene, 6.75 weight percent 1,4-hexadiene, 0.25 weight percent 2,5-norbornadiene; maleic anhydride content about 2.2 weight percent.

Thermoplastic Copolymers

C-7: Styrene/citraconic anhydride copolymer containing 5 weight percent citraconic anhydride and having a melt flow rate (Condition L) of about 1.6 g/10 min.; prepared in accordance with U.S. Pat. No. 2971,939.

C-8: Styrene/maleic anhydride copolymer containing 10 weight percent maleic anhydride and 3 parts by weight of a styrene/butadiene block copolymer rubber per 100 parts copolymer and having a melt flow rate (Condition L) of about 1.8; prepared in accordance with U.S. Pat. No. 3,919,354.

C-9: Styrene/maleic anhydride copolymer containing 14 weight percent maleic anhydride and 15 parts by weight polybutadiene rubber per 100 parts copolymer and having a melt flow rate of about 1.0 g/10 min.; prepared in accordance with U.S. Pat. No. 3,919,354.

C-10: Styrene/maleic anhydride/acrylonitrile terpolymer containing 70 weight percent styrene, 10 weight percent maleic anhydride, and 20 weight percent acrylonitrile; prepared in accordance with U.S. Pat. No. 4,223,096.

C-11: Styrene/maleic anhydride/methyl methacrylate terpolymer containing 68 weight percent styrene, 15 weight percent maleic anhydride, and 17 weight percent methyl methacrylate and additionally
containing 14 parts by weight SBR (styrene-butadiene rubber per 100 parts terpolymer); prepared in accordance with U.S. Pat. No. 4,341,695.

TABLE I

| EXAMPLE NO. | 1* | 2 | 3 | 4 | 5 |
|---|---|---|---|---|---|
| Polyamide | A-1 | A-1 | A-1 | A-1 | A-1 |
| pbw | 56(I) | 56(I) | 56(I) | 56(I) | 56(I) |
| Functionalized Elastomer | B-1 | B-1 | B-1 | B-2 | B-2 |
| pbw | | | | | |
| Thermoplastic Copolymer | C-1 | C-1 | C-1 | C-1 | C-1 |
| pbw | 30(I) | 30(II) | 10(I) 20(II) | 30(II) | 30(II) |
| Penetration Impact | | | | | |
| T = 73° C. | | | | | |
| total energy (ft-lb) | 40 | 44 | 46 | 41 | 47 |
| max. load (lb) | 965 | 961 | 1007 | 954 | 1026 |
| T = 0° F. | | | | | |
| total energy (ft-lb) | 2.5 | 38 | 32 | | |
| max. load (lb) | 354 | 1153 | 1196 | | |
| T = −20° F. | | | | | |
| total energy (ft-lb) | 1.8 | 23 | 4.5 | 6.3 | 56 |
| max. load (lb) | 239 | 1219 | 489 | 689 | 1292 |
| Tensile (2"/min) | | | | | |
| Yield (ksi) | 6.6 | | | 7.0 | 6.9 |
| Elongation (%) | 184 | | | 84 | 142 |
| Flexural | | | | | |
| Yield (kis) | 11.2 | | | 12.2 | 11.6 |
| Modulus (ksi) | 275 | | | 302 | 281 |
| Notched Izod (ft-lb/in) | | | | | |
| T = 73° F. | 2.7 | 10.9 | 2.0 | 13.2 | 17.6 |
| = −20° F. | 1.5 | 1.7 | 1.3 | 1.9 | 16.6 |
| Melt Index (Condition L) | | | | | 0.13 |

(I): component added in first feed
(II): component added downstream in second feed
*comparative example

TABLE II

| EXAMPLE NO. | 6 | 7 | 8 | 9 | 10 | 11 | 12 | 13 | 14 |
|---|---|---|---|---|---|---|---|---|---|
| Polyamide | A-2 | A-2 | A-3 | A-3 | A-1 | A-1 | A-2 | A-2 | A-2 |
| pbw | 56 | 56 | 56 | 56 | 56 | 56 | 56 | 56 | 56 |
| Functionalized Elastomer | B-2 | B-2 | B-2 | B-2 | B-2 | B-2 | B-2 | | |
| pbw | 14 | 14 | 14 | 14 | 14 | 14 | 14 | 14 | 14 |
| Thermoplastic Copolymer | C-1 | C-1 | C-2 | C-2 | C-2 | C-2 | C-3 | C-2 | C-4 |
| pbw | 30 | 30 | 30 | 30 | 30 | 30 | 30 | 30 | 30 |
| Method of Blending | D | E | D | E | D | E | E | E | E |
| Penetration Impact | | | | | | | | | |
| T = 73° C. | | | | | | | | | |
| total energy (ft-lb) | 49 | 47 | 49 | 51 | 45 | 52 | 42 | 49 | 52 |
| max. load (lb) | 1045 | 1004 | 1086 | 979 | 995 | 1044 | 1069 | 1023 | 1081 |
| T = −20° F. | | | | | | | | | |
| total energy (ft-lb) | 53 | 52 | 39 | 60 | 43 | 58 | 41 | 58 | 63 |
| max. load (lb) | 1289 | 1260 | 1296 | 1305 | 1270 | 1303 | 1366 | 1330 | 1331 |
| T = −40° F. | | | | | | | | | |
| total energy (ft-lb) | 19 | 45 | 29 | 42 | 23 | 48 | 18 | 55 | 34 |
| max. load (lb) | 1001 | 1291 | 1162 | 957 | 1255 | 1291 | 1287 | 1347 | 1280 |
| Notched Izod (ft-lb/in) | | | | | | | | | |
| T = 73° F. | 19.5 | 17 | 15.7 | 15 | 14.6 | 14.9 | 3.7 | 13.6 | 19.8 |
| = −20° F. | 18.8 | 14.9 | 5.1 | 14.6 | 3.2 | 12.4 | | 13.8 | 18 |
| = −40° F. | | | 3.9 | 12.4 | | 4.3 | | | |
| Melt Index (Condition L) | 0.28 | | | | | | | | 2.15 |

| EXAMPLE NO. | 15 | 16 | 17 | 18 | 19 |
|---|---|---|---|---|---|
| Polyamide | A-1 | A-1 | A-1 | A-1 | A-1 |
| pbw | 56 | 56 | 56 | 52 | 52 |
| Functionalized Elastomer | B-2 | B-2 | B-2 | B-2 | B-2 |
| pbw | 14 | 14 | 14 | 13 | 13 |
| Thermoplastic Copolymer | C-3 | C-5 | C-6 | C-2 | C-6 |
| pbw | 30 | 30 | 30 | 35 | 35 |
| Method of Blending | D | D | D | D | D |
| Penetration Impact | | | | | |
| T = 73° C. | | | | | |
| total energy (ft-lb) | 34 | 46 | 46 | 45 | 47 |
| max. load (lb) | 1050 | 1100 | 1043 | 1032 | 991 |

TABLE II-continued

| T = −20° F. | | | | | |
|---|---|---|---|---|---|
| total energy (ft-lb) | 7 | 16 | 55 | 3 | 2.8 |
| max. load (lb) | 790 | 999 | 1321 | 499 | 240 |
| T = −40° F. | | | | | |
| total energy (ft-lb) | — | — | 50 | — | 2.0 |
| max. load (lb) | — | — | 1279 | — | 318 |
| Notched Izod (ft-lb/in) | | | | | |
| T = 73° F. | 2.2 | 2.2 | 5.4 | 2.0 | 13.9 |
| = −20° F. | — | — | 2.5 | 1.7 | 2.6 |
| = −40° F. | — | — | 2.3 | — | 2.5 |

TABLE III

| EXAMPLE NO. | 20 | 21 | 22 | 23 | 24 |
|---|---|---|---|---|---|
| Polyamide | A-4 | A-5 | A-6 | A-7 | A-8 |
| pbw | 63 | 75 | 43 | 60 | 35 |
| Functionalized Elastomer | B-4 | B-5 | B-6 | B-7 | B-8 |
| pbw | 12 | 8 | 22 | 15 | 25 |
| Thermoplastic Copolymer | C-7 | C-8 | C-9 | C-10 | C-11 |
| pbw | 25 | 17 | 35 | 25 | 40 |
| Method of Blending | D | E | F | D | E |

We claim:

1. A process for producing a moldable polymer blend having improved low temperature impact properties comprising the steps of:
   (A) forming a first blend composition by melt-blending at a temperature of from 240° C. to 330° C.:
      (i) a polyamide having a number average molecular weight of at least about 8,000;
      (ii) a functionalized elastomer having pendent anhydride groups which is an adduct of an α, β-unsaturated carboxylic acid anhydride and an elastomeric polymer selected from the group consisting of:
         (a) a random copolymer consisting essentially of ethylene, at least one $C_3$ to $C_6$ α-olefin, and at least one diene monomer;
         (b) a block copolymer wherein at least two blocks consist essentially of recurring units of at least one monovinyl aromatic monomer and at least one other block consists essentially of recurring units of at least one conjugated diene, and wherein said other block is substantially hydrogenated such that the unsaturation level of said other block is less than 20 percent of the original unsaturation level;
         (c) a random copolymer of at least one monovinyl aromatic monomer and at least one conjugated diene, wherein said random copolymer is substantially hydrogenated such that the unsaturation level of said random copolymer is less than 20 percent of the original unsaturation level; and
         (d) a conjugated diene polymer, wherein said conjugated diene polymer consists of a conjugated diene or a mixture of conjugated dienes and is substantially hydrogenated such that the unsaturation level of said polymer is less than 20 percent of the original unsaturation level; and
      (iii) optionally, a first portion of an impact-modified thermoplastic copolymer composition comprised of a) a thermoplastic copolymer having a number average molecular weight of at least about 30,000 obtained by copolymerization of a monomer mixture comprising 1 to 30 weight percent of a unsaturated carboxylic acid anhydride, 50 to 99 weight percent of a vinyl aromatic monomer, and up to 40 weight percent of an unsaturated monomer selected from the group consisting of unsaturated carboxylic acids, unsaturated dicarboxylic acid imides, unsaturated nitrile monomers, and unsaturated carboxylic acid esters and b) from 2 to 25 parts by weight per 100 parts by weight thermoplastic copolymer of an impact modifier chemically grafted to the thermoplastic copolymer and having a glass transition temperature below 0° C., said impact modifier being selected from the group consisting of butadiene rubber, EPDM rubber, butadiene-acrylonitrile rubber, butadiene-styrene rubber, isoprene rubber, isoprene-styrene rubber, and butadiene-styrene block copolymers; and
   (B) melt-blending said first blend composition and a second portion of the impact-modified thermoplastic copolymer composition at a temperature of from 240° C. to 330° C., with the proviso that the amount of the first portion of the impact-modified thermoplastic copolymer composition is no greater than the amount of the second portion of the impact-modified thermoplastic copolymer composition.

2. The process of claim 1 wherein the resulting moldable polymer blend is comprised of from about 9 to 94 weight percent of the polyamide, from about 5 to 90 weight percent of the impact modified thermoplastic copolymer composition, and from about 1 to 30 weight percent of the functionalized elastomer.

3. The process of claim 1 wherein the polyamide is selected from the group consisting of nylon-6, nylon-6,6, nylon-6,12, nylon-6-10, nylon-11, and nylon-12.

4. The process of claim 1 wherein the α, β-unsaturated carboxylic acid anhydride in the monomer mixture is maleic anhydride.

5. The process of claim 1 wherein the vinyl aromatic monomer in the monomer mixture is styrene.

6. The process of claim 1 wherein the monomer mixture consists essentially of from about 1 to 30 weight percent maleic anhydride and from about 70 to 99 weight percent styrene.

7. The process of claim 1 wherein the α, β-unsaturated carboxylic acid anhydride in the adduct is maleic anhydride.

8. The process of claim 1 wherein the elastomeric polymer is a random copolymer of ethylene, propylene, and at least one nonconjugated diene selected from the group consisting of 1,4-hexadiene, 5-ethylidene-2-norbornene, and dicyclopentadiene.

9. The process of claim 1 wherein the elastomeric polymer is a random copolymer of styrene and butadiene wherein said random copolymer is substantially hydrogenated such that the unsaturation level of said random copolymer is less than 20 percent of the original unsaturation level.

10. The process of claim 1 wherein the elastomeric polymer is a butadiene polymer which consists of butadiene and is substantially hydrogenated such that the unsaturation level is less than 20 percent of the original unsaturation level.

11. The process of claim 1 wherein the elastomeric polymer is a block copolymer of styrene and butadiene wherein the butadiene blocks are substantially hydrogenated such that the unsaturation level is less than 20 percent of the original unsaturation level.

12. The process of claim 1 wherein melt-blending steps (A) and (B) are performed at a temperature of from about 260° C. to 310° C.

13. A process for producing a moldable polymer blend having improved low temperature impact properties comprising the steps of:
(A) forming a first blend composition by melt-blending at a temperature of from 240° C. to 330° C.:
  (i) nylon-6 having a number average molecular weight of at least about 8,000;
  (ii) a functionalized elastomer having pendent anhydride groups which is an adduct of maleic anhydride and an elastomeric polymer selected from the group consisting of:
   (a) a random copolymer consisting essentially of ethylene, propylene, and at least one nonconjugated diene selected from the group consisting of 1,4-hexadiene, 5-ethylidene-2-norbornene, and dicyclopentadiene;
   (b) a block copolymer wherein at least two blocks consist essentially of recurring units of styrene and at least one other block consists essentially of recurring units of butadiene, and wherein said other block is substantially hydrogenated such that the unsaturation level of said other block is less than 20 percent of the original unsaturation level;
   (c) a random copolymer of styrene and butadiene, wherein said random copolymer is substantially hydrogenated such that the unsaturation level of said random copolymer is less than 20 percent of the original unsaturation level; and
   (d) a butadiene polymer consisting of butadiene, wherein said butadiene polymer is substantially hydrogenated such that the unsaturation level of said butadiene polymer is less than 20 percent of the original unsaturation level; and
(B) melt-blending at a temperature of from 240° C. to 330° C. said first blend composition and an impact-modified thermoplastic copolymer composition comprised of a) a thermoplastic copolymer obtained by copolymerization of a monomer mixture consisting essentially of from about 70 to 99 weight percent styrene and from about 1 to 30 weight percent maleic anhydride having a number average molecular weight of at least about 30,000 and b) from 2 to 25 parts by weight per 100 parts by weight thermoplastic copolymer of butadiene-styrene block copolymer chemically grafted to the thermoplastic copolymer and having a glass transition temperature below 0° C.;
wherein said nylon-6 is chemically grafted to said thermoplastic copolymer and said functionalized elastomer, the resulting moldable polymer blend contains from about 9 to 94 weight percent of the nylon-6, from about 5 to 90 weight percent of the impact-modified thermoplastic copolymer composition, and from about 1 to 30 weight percent of the functionalized elastomer, and step (A) is performed in the absence of any of the impact-modified thermoplastic copolymer composition.

* * * * *